United States Patent [19]
Takase et al.

[11] 3,872,029
[45]* Mar. 18, 1975

[54] CATALYST FOR THE CONVERSION OF HYDROCARBON, A METHOD FOR THE PREPARATION OF THE CATALYST

[75] Inventors: Shinji Takase, Kawasaki; Takahiko Yamazi, Yokohama, both of Japan

[73] Assignee: Nippon Oil company, Limited, Tokyo, Japan

[ * ] Notice: The portion of the term of this patent subsequent to Dec. 3, 1991, has been disclaimed.

[22] Filed: July 7, 1972

[21] Appl. No.: 269,712

[30] Foreign Application Priority Data
July 14, 1971 Japan.............................. 46-51769

[52] U.S. Cl. .............................. 252/453, 252/455 Z
[51] Int. Cl................................................ B01j 11/40
[58] Field of Search ............ 252/453, 455 R, 455 Z

[56] References Cited
UNITED STATES PATENTS

| | | | |
|---|---|---|---|
| 2,387,596 | 10/1945 | Marisic............................ | 252/453 X |
| 2,872,410 | 2/1959 | Erickson......................... | 252/453 X |
| 2,921,971 | 1/1960 | Holm et al...................... | 252/453 X |
| 3,210,293 | 10/1965 | O'Hara............................ | 252/453 |
| 3,556,988 | 1/1971 | Stover et al..................... | 252/455 Z |
| 3,705,861 | 12/1972 | Oguchi et al. .................. | 252/453 X |

Primary Examiner—C. Dees

[57] ABSTRACT

The present invention discloses (1) a method for the preparation of a catalyst for the conversion of hydrocarbon which comprises the steps: Preparing silica-alumina by reacting an aluminum compound and a silicon compound in an aqueous solution while maintaining the pH at least at 10, adding to the reaction product an acid to adjust the pH to 1–7, followed by, if necessary, addition of an aluminum compound and/or silicon compound and then raising pH of the resulting acid solution to 5–9 by addition of an alkali; blending said silica-alumina and crystalline alumino-silicate having a silica and alumina molar ratio of at least 2.5 : 1 and a micro-pore diameter of 5–15 A so that the crystalline alumino-silicate content is from 5 to 60% by weight on the basis of the finished catalyst; and carrying thereon at least one hydrogenation-active metal; said blending of crystalline alumino-silicate being conducted at any step before drying for dehydration of the silica-alumina, and at least 60% of an ion-exhangeable alkali metal of said crystalline alumino-silicate being replaced with hydrogen and/or at least one polyvalent metal before and/or after said blending, (2) a catalyst for the conversion of hydrocarbon prepared by said method and (3) "a process for the conversion of hydrocarbon fraction" using the catalyst.

16 Claims, No Drawings

CATALYST FOR THE CONVERSION OF HYDROCARBON, A METHOD FOR THE PREPARATION OF THE CATALYST

BACKGROUND OF THE INVENTION

1. Field of the invention

The present invention relates to a novel catalyst for the conversion of hydrocarbon and a process for the conversion of hydrocarbon using the catalyst.

More particularly, it is concerned with a novel catalyst for the conversion of hydrocarbon and a process for preparing the catalyst, which comprises blending silica-alumina can crystalline alumino-silicate and carrying a hydrogenation-active metal thereon, and "a hydroconversion process of hydrocarbon fractions" using the catalyst.

Further particularly, the invention is concerned with (1) a method for preparing a catalyst for the conversion of hydrocarbon which comprises the steps: preparing silica-alumina by reacting an aluminum compound and a silicon compound in an aqueous solution while maintaining the pH at least at 10, adding to the reaction product an acid to adjust the pH to 1–7, followed by, if necessary, addition of an aluminum compound and/or a silicon compound and then raising pH of the resulting acid solution to 5–9 by addition of an alkali; blending said silica-alumina and crystalline aluminosilicate having a silica and alumina molar ratio of at least 2.5 : 1 and micro-pore diameter of 5–15 A so that the finished catalyst contains 5–60% by weight of said crystalline alumino-silicate; and carrying at least one hydrogenation-active metal thereon; said blending of crystalline alumino-silicate being conducted at any step before drying for dehydration of silica-alumina, and at least 60% of an ion-exchangeable alkali metal of said crystalline alumino-silicate being replaced with hydrogen and/or at least one polyvalent metal before and/or after said blending, (2) a catalyst for the conversion of hydrocarbon prepared by said method and (3) a hydroconversion process of hydrocarbon fractions containing at least 70% by volume of a fraction boiling at least at 300°C. using the catalyst.

2. Description of the prior art

In general, it is well-known to prepare hydrocarbon fractions of higher additional value by conversion of the fractions through contact with a catalyst in the presence of hydrogen. The hydro-conversion reactions of hydrocarbons are mainly as follows: hydrogenation reaction, hydroisomerization reaction, hydrodesulfurization reaction, hydrodenitrogenation reaction, hydroreforming reaction, hydrocracking reaction, hydrorefining reaction and others. Various catalysts for the conversion of hydrocarbon are used in these hydro-conversion reactions of hydrocarbons. Generally, these catalysts are composed of a component for hydrogenation and a component for cracking. The component for hydrogenation as referred to herein mainly means metals of Groups IB, VI, VII and VIII in the Periodic Table, for example, cooper, silver, chromium, molybdenum, tungsten, manganese, rhenium, iron, cobalt, nickel, platinum, palladium, ruthenium, rhodium, irridium and the like metals and oxides and sulfides of these metals. These metals may be used in combination of two or more members. For example, combination of metals such as nickel-tungsten, cobalt-molybdenum, nickel-cobalt-molybdenum and platinum-rhenium and oxides and sulfides thereof. The component for cracking as referred to herein includes non-crystalline substrate for cracking such as alumina, silica-alumina and silica-magnesia or crystalline substrate for cracking such as natural or synthetic crystalline alumino-silicate. The crystalline substrate for cracking includes, for example, natural faujasite, mordenite and erlionite and synthetic zeolite X and Y.

The hydrocarbon conversion catalyst of crystalline substrate for cracking is characteristic of being generally higher in conversion activity of light hydrocarbon fractions and less in activity degradation caused by poison of organic nitrogen compound included in the feed hydrocarbon than the catalyst of non-crystalline substrate for cracking. In the conversion reaction of heavy hydrocarbon fraction used as a starting material such as atmosphere-distilled residual oil and deasphalted vacuum residual oil, however, the conversion catalyst of crystalline substrate for cracking is often inferior in conversion activity to the catalyst of non-crystalline substrate for cracking, because the crystalline substrate for cracking has a micro-pore diameter of at most about 15 A while, for example, a polycyclic aromatic compound in a heavy hydrocarbon fraction has a molecular diameter larger than 15 A so that the polycyclic aromatic compound can not diffuse into a micro-pore wherein most of active sites for the conversion of hydrocarbon exists.

On the other hand, the hydrocarbon conversion catalyst of non-crystalline substrate for cracking generally has a micro-pore diameter of at least about 30 A. Therefore, a compound having a large molecular diameter such as polycyclic aromatic compound in a heavy hydrocarbon fraction can also diffuse into a micropore, wherein active sites for conversion reaction exist. However, if the hydrocarbon conversion catalyst of non-crystalline substrate for cracking is used for the conversion reaction of a heavy hydrocarbon fraction containing impurities such as sulfur, nitrogen and asphaltene, it is associated with a large deposition of carbonaceous materials mainly causative of activity degradation. Therefore, this catalyst cannot by used satisfactorily in practice.

Thus, the hydrocarbon conversion catalysts including crystalline or non-crystalline substrate for cracking, respectively, have not been sufficient for independently converting both light and heavy hydrocarbon fractions. In addition, the known conversion catalyst combining crystalline or non-crystalline substrates for cracking has not been used satisfactorily in practice since it is associated with a large deposition of carbonaceous materials mainly causative of activity degradation in the conversion of a heavy hydrocarbon fraction containing impurities such as sulfur, nitrogen and asphaltene.

SUMMARY OF THE INVENTION

It is an object of the present invention to provide a hydrocarbon conversion catalyst, which removes the above-mentioned drawback of crystalline or non-crystalline substrate for cracking and which is capable of hydroconversion of hydrocarbon fractions including both light and heavy fractions, and a method for preparing the catalyst.

Another object of the invention is to provide a novel catalyst for the conversion of hydrocarbon, which is superior in resistance to poison caused by impurities such as sulfur and nitrogen in the hydro-conversion reaction of hydrocarbon fractions and which is associated with a less deposition of carbonaceous materials mainly causative of activity degradation and has a long catalytic life, and a method for preparing the catalyst.

Further object of the invention is to provide a practical catalyst having a high crush strength for the conversion of hydrocarbon, which comprises silica-alumina and crystalline alumino-silicate carrying hydrogenation-active metal thereon, and a method for preparing the catalyst.

Still another object of the invention is to provide a hydro-conversion process of hydrocarbon fractions including at least 70% by volume of a fraction boiling at least at 300°C. and preferably a process for the hydroconversion of hydrocarbon fraction substantially boiling at least at 300°C.

DESCRIPTION OF THE INVENTION

The catalyst of the present invention for the conversion of hydrocarbon is prepared by a process which comprises preparing silica-alumina by reacting an aluminum compound and a silicon compound in an aqueous solution while maintaining the pH at least at 10, adjusting the pH of the reaction product to 1–7 by addition of an acid, followed by, if necessary, addition of an aluminum compound and/or silicon compound and raising the pH of the acid solution to 5–9 by addition of an alkali, followed by washing and drying for dehydration; blending said silica-alumina and crystalline alumino-silicate having a silica and alumina molar ratio of at least 2.5 : 1 and a micropore diameter of 5–15 A so that the finished catalyst contains 5–60% by weight of said crystalline alumino-silicate; and carrying at least one hydrogenation-active metal thereon; said blending of crystalline alumino-silicate being conducted at any step before drying for dehydration of silica-alumina, and at least 60% of an ion-exchangeable alkali metal of said crystalline alumino-silicate being replaced with hydrogen or at least one polyvalent metal before and/or after said blending.

The silica-alumina used in the present invention is prepared by the process as described below. An alumina compound and a silicon compound are reacted in aqueous solution while maintaining the pH at least at 10 and preferably 10 to 14. To the resulting product is added an acid to adjust the pH to 1–7. Then, the pH of the acid solution is raised to 5–9 by addition of an alkali, followed by washing and drying for dehydration. Alternatively, an aluminum compound and a silicon compound are reacted in aqueous solution while maintaining the pH at least at 10. To the resulting product is added an acid to adjust the pH to 1–7. After addition of an aluminum compound and/or a silicon compound to the acid solution, its pH is raised to 5–9 by addition of an alkali. Then, the resulting mixture is washed and dried for dehydration.

The silica-alumina prepared by the method according to the present invention usually contains 5–95% by weight of silica and preferably 30–90% by weight of silica and 70–10% by weight of alumina. If desired, halogen such as fluorine or chlorine may be combined by conventional means. In such a case, the halogen content is from 0.3 to 15% by weight on the basis of the catalyst.

The silicon compounds as referred to herein are water-soluble and include, for example, alkali metal silicates, water glass, silica sol and organic-silicon compounds. Usually, water glass is employed. The aluminum compounds as referred to herein are water-soluble and include, for example, aluminum sulfate, aluminum nitrate, aluminum chloride, alum, sodium aluminate and organo-aluminum compounds. If necessary, these compounds or solutions thereof may be used following adjustment of the pH to a desired value by addition of an acid or a base.

The reaction between a silicon compound and an aluminum compound as referred to herein implies, unlike the case wherein silica gel and alumina gel are merely mixed, formation of a chemical bonding between the silica and the alumina in the prepared silica-alumina. The chemical bonding of the said silica and alumina may be stoichiometrical or non-stoichiometrical.

The blending of silica-alumina and crystalline alumino-silicate as referred to in the present invention means intimately blending and highly dispersing crystalline alumino-silicate at any step before drying for dehydration of silica-alumina in the method for preparing silica-alumina. It does not mean merely mixing dried and dehydrated silica-alumina and crystalline alumino-silicate.

In more detail, the silica-alumina used for the hydrocarbon conversion catalyst of the present invention is prepared according to the method as described below. The method for preparing the catalyst, of course, is not limited to those described below but may be any ones as desired provided that they are within the scope as described above. A silicon compound as the silica source in the finished catalyst is used, for example, water glass, which is added, for example, to an aqueous ammonium solution. The ammonia is added in order to maintain pH in the reaction of a mixture of the silicon compound and an aluminum compound at least at 10 as well as to accelerate the reaction. The maintenance of pH at least at 10 may be effected by addition of an inorganic or organic base other than ammonia. If the pH is maintained at least at 10 in the absence of the base, it may not be added. It is, however, preferable to carry out the reaction in the presence of a base. Then an aluminum compound as the alumina source in the finished catalyst, for example, aluminum nitrate in aqueous solution is added to the aqueous ammonium solution of water glass previously prepared, followed by mixing and reacting. The addition and mixing are conducted at a temperature, say, from −10 to 90°C. Until completion of the reaction between the silicon compound and the aluminum compound pH of the reaction mixture should be maintained at least at 10. After completion of the addition of aqueous solution of aluminum nitrate the mixed solution containing the reaction product is subjected to aging for a period of time from 0.1 to 100 hours, at a temperature from −10 to 90°C. while adjusting the pH to 1–7 by addition of an acid such as hydrochloric acid. Aging is not an essential feature of the present invention, but it is desirable to be carried out. By changing the aging conditions, satisfactory and excellent catalysts may be obtained. Preferable aging range is 0.5 to 48 hours. Then, an alkali, for example, ammonia is added to the aqueous acid solution to raise the pH to 5–9, followed by further aging for additional 0.1–240 hours. The mixed solution containing silicaalumina hydrate thus obtained is filtered and washed with a diluted solution, for example, of aqueous ammonia, ammonium nitrate or ammonium chloride to remove impurities such as alkali metals. The washed silica-alumina hydrate is dried at 60–180°C. for 1–50 hours. The washing and the drying may be carried out in the reversed order. In this method of preparation, an alternative process may be applied which involves addition of at least one of aluminum compound and/or silicon compound after adjusting pH to 1–7 by the addition of an acid and aging, and further addition of an alkali to adjust the pH of the aqueous acid solution to 5–9, followed by aging, filtering and washing of silica-alumina hydrate.

The silica-alumina thus prepared is higher in hydrocarbon conversion activity and is associated with very little deposition on the catalyst of carbonaceous materials causative of reactivity degradation than the silica-alumina obtained by the known method. Moreover, the silica-alumina prepared by the method of the present invention has a micro-pore radius in a wide distribution from about 20 to 500 A, an average micro-pore radius being in the range from about 50 to 200 A, which is far larger than that in the known silica-alumina being about 20–50 A.

If the reaction between a silicon compound and an aluminum compound is carried out at a pH below 10, it will be beyond the scope of the present invention. The silica-alumina catalyst obtained from such reaction is inferior to the silica-alumina catalyst of the present invention, since it is associated with a large deposition of carbonaceous materials.

Moreover, if the reaction is carried out at a pH of at least 10 but pH adjustment as disclosed herein is not conducted in the subsequent step, there will be formed only a catalyst with a lower crush strength.

Crystalline alumino-silicate to be blended with the silica-alumina in the present invention has a silica and alumina ratio of at least 2.5 : 1 ($SiO_2/Al_2O_3 = 2.5$) and a micro-pore diameter of about 5–15 A. The crystalline alumino-silicate as referred to herein includes, for example, natural or synthetic mordenite, faujasite, synthetic zeolite X, zeolite Y and the like. Crystalline aluminosilicate having a micro-pore diameter below 5 A is not desirable, since it is low in hydrocarbon conversion activity. Normally, 10–150 parts by weight of preferably comminuted crystalline alumino-silicate having a micro-pore diameter of about 5–15 A and a silica and alumina ratio of at least 2.5 : 1 are added to 100 parts by weight of silica-alumina so that the finished catalyst contains 5–60% by weight of crystalline alumino-silicate. The process for blending crystalline alumino-silicate and silica-alumina may be conducted at any step before drying for dehydration of silica-alumina in the process for preparing silica-alumina as mentioned above. The crystalline alumino-silicate may be added, for example, to an aqueous solution having a pH at least at 10, a solution of a silicon compound and an aluminum compound or a mixed solution comprising an aqueous solution having the pH at least at 10 and a silicon compound or an aluminum compound. The adding and blending may be conducted after mixing and reacting a silicon compound and an aluminum compound while maintaining the pH at least at 10. Alternatively, the adding and mixing may be conducted after adding to the reaction product an acid to adjust the pH to 1–7 or adding an alkali to raise the pH to 5–9 followed by aging or after washing silica-alumina hydrate.

The crystalline alumino-silicate may be subjected to an ion-exchange treatment with a solution containing a metal ion which can be exchanged for an alkali metal by the known process. Thus, a catalyst having a high activity for the conversion of hydrocarbon may be prepared. The metal cation exchangeable for an alkali metal ion contained in the crystalline alumino-silicate includes metals of Groups IB – VIII in the Periodic Table and rare-earch metals. Further, in order to replace an alkali metal in the crystalline alumino-silicate with hydrogen, an ion-exchange treatment may be conducted with a solution containing a cation such as ammonium ion. Alkali metal cation may be replaced with a mixture of metal cations as mentioned above or a mixture of metal cation and hydrogen-containing cation. Mordenite may be treated directly with a mineral acid to replace an alkali metal cation with hydrogen. Moreover, the present invention can use the mordenite having a silica and alumina ratio of at least 10 after dissolving the aluminum content by an acid treatment.

The desirable crystalline alumino-silicate includes rare earch metal cation, hydrogen cation, iron group metal cation or metal cations prepared by combining these cations. In any case, in order to obtain the desirable hydrocarbon conversion activity, it is necessary to exchange at least 60%, and preferably at least 80% of an exchangeable alkali metal contained in the crystalline alumino-silicate for the hydrogen and/or metal cations. The ion-exchange of an alkali metal contained in the crystalline alumino-silicate may be conducted before and/or after blending silica-alumina and crystalline alumino-silicate.

Although the amount of hydrogenation-active metal component to be carried on the silica-alumina and crystalline alumino-silicate substrate thus prepared varies depending upon the hydrogenation-active metal employed, it is from about 0.1 to about 40% by weight on the basis of the finished catalyst.

The hydrogenation-active metal as referred to in the present invention mainly means metals of Groups VI, VII and VIII in the Periodic Table, for example, chromium, molybdenum, tungsten, manganese, rhenium, platinum, palladium, irridium, iron, cobalt, nickel and the like metals and oxides and sulfides of these metals. These metals may be used in combination of two or more members, for example, combinations of metals such as nickel-tungsten, nickel-molybdenum, cobalt-molybdenum, nickel-cobalt-molybdenum and platinum-rhenium and oxides and sulfides thereof.

When using a precious hydrogenatiion-active metal such as platinum and palladium, the precious metal content is about 0.1–2.0% by weight on the basis of the finished catalyst. When using a hydrogenation-active metal such as nickel, cobalt, tungsten and molybdenum, the metal content is about 5.0–40.0% by weight on the basis of the finished catalyst. When the carried hydrogenation-active metal amount is less than the above-mentioned range, a sufficient hydrogenation activity cannot be obtained. On the other hand, when the metal amount is more than the above range, the cost of the catalyst uneconomically increases.

These hydrogenation-active metals may be carried by the known method. For example, the dried and dehydrated silica-alumina and crystalline alumino-silicate substrate prepared by the method according to the present invention may be impregnated with an aqueous solution of a metal to be carried on the substrate, followed by drying and calcining. Alternatively, to the silica-alumina hydrate and crystalline alumino-silicate substrate before drying for dehydration may be added a metal compound or an aqueous solution thereof to be carried on the substrate, followed by kneading and then by drying and calcining. Alternatively, a metal may be carried by an ion-exchange treatment.

The catalyst thus prepared may be satisfactorily molded by any known method. For example, the silica-alumina hydrate and crystalline alumino-silicate carrying hydrogenation-active metal thereon may be molded by extrusion as it is or after addition of a binder. Alternatively, the dried or calcined silica-alumina and crystalline alumino-silicate carrying hydrogenation-active metal thereon may be molded by compression. It is possible and desirable to use the catalyst of the present invention after molding it by extrusion as it is without adding a binder.

The hydrocarbon conversion catalyst of the present invention comprising silica-alumina and crystalline alumino-silicate carrying hydrogenation-active metal thereon shows various characteristics such as superior activity, a less deposition of carbonaceous materials and a long catalytic life, when used for hydro-conversion reaction of a hydrocarbon fraction boiling at least at about 200°C., and preferably at least at about 300°C.

The reaction conditions under which the catalyst is used for the conversion of hydrocarbon are, in general, a reaction temperature from 100 to 600°C., a reaction pressure from 10 to 250 Kg./cm.$^2$G, a liquid space velocity from 0.1 to 20.0 vol./vol./hr. and a hydrogen flow rate from 100 to 4,000 NTP liter/liter of starting material. The reaction condition may be varied in the range as mentioned above depending upon composition of the feed hydrocarbon, object product, composition of the catalyst employed and the like. Any known type of the reaction, for example, the fixed bed type, transferred bed type or fluidized bed type, may be employed. But the fixed bed type is preferable.

The main hydro-conversion reactions of hydrocarbon fractions according to the present invention are as follows: hydrogenation reaction, hydroisomerization reaction, hydrodesulfurization reaction, hydrodenitrogenation reaction, hydrocracking reaction and the like. The catalyst of the present invention is particularly superior in hydrocracking and hydrorefining reactions of a heavy hydrocarbon fraction boiling at least at about 300°C. and containing impurities such as sulfur and nitrogen.

The feed hydrocarbon fraction includes, for example, light kerosene, vacuum-distilled oil fraction, atmosphere-distilled residual oil, deasphalted vacuum residual oil and deasphalted atmosphere-distilled residual oil boiling at least at about 200°C., and preferably at least at about 300°C. These fractions may be used as they contain impurities such as sulfur, nitrogen, residual carbonaceous material and asphaltene or after removing these impurities by pre-treatment.

DESCRIPTION OF PREFERRED EMBODIMENTS

Example 1

This example is given in order to illustrate that a high quality lubricating oil fraction can be obtained by hydrotreating of propane-deasphalted vacuum residual oil as a feed oil with the nickel-tungsten-silica alumina-crystalline alumino-silicate catalyst of the present invention.

The preparative method of the catalyst is as follows 302 grams of sodium meta-silicate were dissolved in 2 liters of pure water. The resulting solution was added to 1 liter of 14% solution of ammonium hydroxide. The solution mixture was then allowed to stand for 1 hour. To the mixture were added 62 grams of comminuted synthetic crystalline alumino-silicate Y. The pH at that time was 13.8. To the solution was added with stirring slowly drop by drop an aqueous solution prepared by dissolving 200 g. of aluminum nitrate in 500 ml. of pure water. The pH after completion of the adding and mixing was 12.1. A precipitate was obtained by the adding and mixing. Stirring was continued for additional 1 hour, followed by addition of 10% aqueous hydrochloric acid to adjust the pH to 4.5 and then stirring for 2 hours. The resulting acid solution was further allowed to stand still overnight for aging. To the solution were then added 2 liters of an aqueous solution prepared by dissolving 303 grams of sodium meta-silicate and 111 grams of aluminum nitrate in aqueous hydrochloric acid. The resulting mixture was stirred for 1 hour to adjust the pH to 3.7. Further, in order to adjust the pH to 7.3, aqueous ammonia was added to the mixture, which was then allowed to stand for 1 day. The resulting product was filtered and the filtered matter was washed and further filtered after dispersed in 10 liters of 3% aqueous solution of ammonium nitrate. The washing was repeated 5 times. The washed matter was dispersed in 6 liters of 10% aqueous solution of nickel nitrate to be subjected to an ion-exchange treatment, which was repeated 3 times. Then, the silica-alumina and crystalline alumino-silicate substrate thus prepared was added to 500 ml. of an aqueous solution containing 74 grams of nickel nitrate and 52 grams of silico-tungstic acid and adjusted to the pH of 4.2 by addition of aqueous ammonia. The resulting mixture was kneaded for 2 hours by kneader. The kneaded mixture was dried appropriately and then molded by extrusion. The mixture was dried at 120°C. for 24 hours and calcined in air at 550°C. for 5 hours. The catalyst thus prepared was 5 mm. in length and 3 mm. in diameter. The catalyst was analyzed to find a nickel content of 8.3% by weight, a tungsten content of 14.7% by weight, a sodium content of 0.1% by weight and an average micro-pore radius of 66 A. The catalyst is referred to as Catalyst [A].

As comparative examples to the Catalyst [A] of the present invention, there were used the following three catalysts: silica-alumina substrate, synthetic crystalline alumino-silicate Y substrate and conventional silica-alumina and crystalline alumino-silicate Y substrate. Catalyst [B] of silica-alumina substrate was a commercially available nickel-tungsten-silica-alumina having a nickel content of 6.1% by weight and a tungsten content of 15.2% by weight, and said silica-alumina being approximately composed of silica of 75% by weight and alumina of 25% by weight. The preparative method of Catalyst [C] of crystalline alumino-silicate Y substrate is as follows:

180 grams of nickel chloride were dissolved in 3 liters of pure water, followed by addition of aqueous ammonia to adjust the pH to 4.3. The resulting solution was subjected to an ion-exchange treatment by adding 300 grams of synthetic crystalline alumino-silicate Y. This process was repeated 5 times. Then, another ion-exchange treatment was repeated 3 times by adding 2 liters of 5% aqueous ammonia, followed by washing with pure water. The resulting mass was dried at 120°C. for 24 hours and calcined at 550°C. for 3 hours. The mass was then impregnated with tungsten by mixing an aqueous solution of tungstic acid containing ammonium hydroxide and 17% by weight of tungsten. The resulting product was dried at 120°C. for 24 hours, calcined at 550°C. for 5 hours and then molded by extrusion by addition of a binder. The Catalyst [C] thus prepared was analyzed to find a nickel content of 4.0% by weight and a tungsten content of 10.1% by weight.

The preparative method of Catalyst [D] of known silica-alumina and crystalline alumino-silicate Y substrate is as follows:

200 grams of water glass were dissolved in 1 liter of pure water. To the resulting solution was added with stirring 10% aqueous solution of hydrochloric acid to adjust the pH to 8. The silica hydrogel thus prepared was allowed to stand for 2 hours for aging. To the resulting product were added 290 ml. of aqueous solution containing 46 grams of aluminum chloride. The pH became 3.1. To the resulting mixture was added with stirring 8% aqueous ammonia. Thus, aluminum hydroxide was deposited on the silica hydrogel for making a reaction and the pH was adjusted to 7.8. Then, the stirring was discontinued, followed by aging for 3 hours. After filtering the product, 21 grams of crystalline aluminosilicate Y were added to the filtered silica-alumina hydrogel, followed by mixing sufficiently. The mixture was washed with 3 liters of 3% aqueous solution of ammonium nitrate. The washing was repeated 12 times. In the same way as disclosed in the preparation of Catalyst [A], to the resulting mixture were then added nickel nitrate and silico-tungstic acid, followed by mixing and kneading. After molded by extrusion, the product was dried at 120°C. for 24 hours and calcined at 550°C. for 5 hours. The Catalyst [D] thus prepared was analyzed to find a nickel content of 7.5% by weight, a tungsten content of 15.1% by weight, a sodium content of 0.2% by weight and an average micro-pore radius of 32 A.

A hydrotreating was conducted on propane-deasphalted Arabian vacuum residual oil as a starting material by using four catalysts as described above. Thie reaction was carried out using a fixed bed reactor having continuous flowing type under the reaction conditions: a reaction temperature of 390°C.; a reaction pressure of 100 Kg./cm.²G; a liquid space velocity of 0.7 vol./vol./hr.; and a hydrogen flow rate of 2,000 NTP liter/liter - oil. Properties of the feed oil employed and yield of the reaction product (results of fractional distillation) are shown in Tables 1 and 2, respectively. Yield of dewaxed lubricating oil fraction in the reaction product and general properties of a dewaxed oil fraction boiling at least at 490°C. are shown in Table 3. These hydrotreated oils were those after 500 hours from initiation of the reaction.

Table 1

| Feed Oil to be hydrotreated | |
|---|---|
| Viscosity at 210°F. | 43.36 cst |
| Sulfur content | 2.69 wt.% |
| Nitrogen | 310 ppm |
| Pour point | +50°C. |

Table 2

Yield of hydrotreated oil

| catalyst boiling point | [A] | [B] | [C] | [D] |
|---|---|---|---|---|
| Below 240°c. | 15.0 | 9.3 | 15.6 | 19.6 |
| 240 – 340°C. | 6.4 | 9.0 | 4.8 | 5.8 |
| Above 340°C. | 78.6 | 81.7 | 79.6 | 74.6 |

Table 3

Yield of dewaxed lubricating oil fraction and specifications of dewaxed oil boiling at least at 490°C.

| Catalyst | [A] | [B] | [C] | [D] |
|---|---|---|---|---|
| Yield of dewaxed lubricating oil fraction (vol.%) | 66.9 | 49.1 | 54.4 | 57.8 |
| Viscosity at 210°F. | 16.38 | 21.07 | 39.52 | 15.26 |
| Viscosity index | 127 | 96 | 82 | 112 |
| Sulfer content (wt.%) | 0.01 | 0.11 | 0.99 | 0.10 |
| Nitrogen (ppm) | below 20 | 80 | 210 | 40 |
| Pour point (°C.) | −15 | −15 | −15 | −15 |

As shown in Tables 2 and 3, the Catalyst [A] of the present invention was found to be able to afford a dewaxed lubricating oil fraction in highest yield, and the lubricating oil fraction having most excellent properties.

Moreover, the catalyst was also found to exert highest desulfuration and denitrogenation activity.

Example 2

This example is given in order to illustrate that a useful light oil fraction can be prepared by hydrocracking of an atmosphere-distilled residual oil as a feed oil using the cobalt-molybdenum-silica-alumina-acid-treated natural mordenite of the present invention.

The preparative method of the catalyst is as follows

To 2 liters of 15% aqueous ammonium solution containing 5% sodium hydroxide were simultaneously added and mixed with stirring 840 ml. of aqueous solution containing 204 grams of water glass and 400 ml. of aqueous solution containing 98 grams of aluminum sulfate. The pH after completion of the addition was 11.2. After aging for 10 hours, the pH was adjusted to 6 by addition of diluted sulfuric acid, followed by aging for further 3 hours. After adjustment of the pH to 2.5 by further addition of diluted sulfuric acid, aqueous ammonia was added to adjust the pH to 8, followed by standing overnight. To silica-alumina hydrate thus aged was filtered and then washed repeatedly with 5% aqueous solution of ammonium chloride and pure water to remove sodium and sulfate ion. To the resulting product were added 50 grams of acid-treated natural mordenite, followed by kneading and intimately blending. This mordenite was prepared by treating natural mordenite in 5 Normal solution of hydrochloric acid under the reflux condition and had a silica and alumina ratio of 25.5. Then, the silica-alumina-acid-treated mordenite was molded by extrusion, dried at 120°C. for 12 hours and calcined in air at 550°C. for 5 hours.

To a solution prepared by adding 132 grams of ammonium paramolybdate to 150 ml. of pure water were added with stirring 300 ml. of concentrated aqueous ammonia. To the homogeneous solution thus prepared was slowly added an aqueous solution prepared by dissolving 105 grams of cobalt nitrate in 100 ml. of pure water, thus preparing a dipping solution containing cobalt and molybdenum. In the dipping solution was dipped the silica-alumina-acid-treated mordenite as prepared above for 3 hours. The supernatant was removed and the remainder was dried at 120°C. for 20 hours and calcined in air at 550°C. for 3 hours. The analysis indicated 3.1% by weight of cobalt and 10.5% by weight of molybdenum carried in terms of metal. The catalyst is referred to as Catalyst [E].

A hydrocracking experiment was conducted on an Arabian light atmosphere-distilled residual oil using the Catalyst [E] under the reaction conditions: a reaction temperature of 400°C.; a reaction pressure of 150 Kg./cm.$^2$G; an LHSV of 0.5 vol./vol./hr.; and a hydrogen flow rate of 1,800 NTP liter/liter - oil. The reaction was carried out using a fixed bed reactor having continuous flowing type. Properties of the feed oil and a formation ratio of light fractions are shown in Tables 4 and 5, respectively. The formation ratio was measured after 200 hours from initiation of the reaction. For comparison's sake, the values obtained by using the Catalyst [B] under the same reaction conditions are also shown in Table 5.

Table 4

| General properties of Arabian light atmosphere-distilled residual oil | |
|---|---|
| Viscosity (cst) at 50°C. | 108.9 |
| Residual carbon (wt.%) | 7.67 |
| Petroleum ether-insoluble matters (wt.%) | 2.48 |
| Sulfur content (wt.%) | 2.81 |
| Vanadium (ppm) | 25 |
| Nickel (ppm) | 5 |
| Nitrogen (ppm) | 1400 |

Table 5

Fractional composition of hydrocracked oil.

| Range of boiling point | Feed oil | Catalyst E | Catalyst B |
|---|---|---|---|
| | vol.% | vol.% | vol.% |
| Below 180°C. | — | 20.0 | 5.7 |
| 180–300°C. | 2.0 | 27.4 | 14.6 |
| Above 300°C. | 98.0 | 52.4 | 79.7 |

As shown above, the Catalyst [E] of the present invention was found to exert a high activity by subjecting an atmosphere-distilled residual oil fraction containing much impurities to a hydrocracking treatment.

Example 3

This example is given in order to illustrate a hydrocracking treatment of hydrogenation-pretreated vacuum-distilled fraction oil by using platinum-silica-alumina-synthetic crystalline alumino-silicate X.

The preparative method of the catalyst is as follows

An aqueous solution prepared by dissolving 525 grams of water glass in 2.3 liters of pure water was added to 600 ml. of concentrated aqueous ammonia, followed by mixing. The pH of the mixed solution was 13.6. To the solution was added with stirring an aqueous solution prepared by dissolving 132 grams of aluminum chloride in 400 ml. of pure water. This addition was conducted in a thermostat vessel and the adding and mixing of the solution at 60°C. The pH after the completion of the adding and mixing was 12.0. After stirring for further 3 hours, the solution was allowed to stand still for 24 hours. To the solution was added 5% aqueous solution of hydrochloric acid to adjust the pH to 2.0, followed by stirring for 1 hour. After adjusting the pH to 6 by addition of aqueous ammonia, an aqueous solution of hydrochloric acid containing 250 grams of water glass was further added. The pH after completion of the addition was 3.1. After stirring the solution mixture for 30 min. and then adjusting the pH of the mixture to 4.1 by addition of aqueous ammonia, 50 grams of commercially available synthetic crystalline alumino-silicate X treated with an ion-exchange by rare earth metal cation. To the mixture was added with further stirring aqueous ammonia to adjust the pH to 9.0. After filtering the mixture, the washing and ion-exchange were simultaneously carried out with 5 liters of 3% aqueous solution of ammonium nitrate. After the process was repeated 5 times, the resulting product was washed with pure water, dried appropriately and molded by extrusion. The product was then dried at 120°C. for 24 hours and calcined at 550°C. for 5 hours. After impregnated with platinum by using an aqueous solution of chloro-platinic acid, the silica-alumina and synthetic crystalline alumino-silicate X substrate was dried at 120°C. for 10 hours and calcined at 500°C. for 3 hours. The catalyst was analyzed to find a platinum content of 0.5% by weight, a sodium content of 0.2% by weight and a rare earth metal content of 2.1% by weight. The catalyst is referred to as Catalyst [F].

Hydrogenation-pretreated Crusania vacuum-distilled fraction oil was subjected to a hydrocracking treatment by using the above catalyst. Tables 6 and 7 show distillation properties of the feed oil and results of fractional distillation of the produced oil, respectively. The feed oil included a sulfur content of 0.10% by weight and a nitrogen content of 60 ppm. The reaction was carried out using a fixed bed reactor under the reaction conditions: a pressure of 70 Kg./cm.$^2$G; a temperature of 340°C.; a liquid space velocity of 1.0 vol./vol./hr.; and a hydrogen flow rate of 1500 NTP liter/liter - oil. The results of fractional distillation of the treated oil were those after 300 hours from initiation of the reaction.

Table 6

Distillation properties of the feed oil.

| Distillation ratio (vol.%) | Distillation temperature (°C.) |
| --- | --- |
| I.B.P. | 376 |
| 5 vol.% | 438 |
| 10 | 451 |
| 30 | 478 |
| 50 | 492 |
| 70 | 508 |
| 90 | 531 |
| 95 | 538 |

Table 7

Results of fractional distillation of the treated oil.

| Range of boiling point | Yield (vol.%) |
| --- | --- |
| Below 210°C. | 35.7 |
| 210–370°C. | 19.5 |
| Above 370°C. | 44.8 |

As shown above, the catalyst of the present invention was found to have a high hydrocracking activity.

Example 4

This example is given in order to illustrate that our hydrocarbon conversion catalyst has a sufficient crush strength.

The crush strength is expressed in terms of the pressure in Kg. required for crushing the extrusion-molded catalyst when placed on the side between two parallel flat steel plates. Measurements were made on the crush strength with 20 pellets of each extrusion-molded catalyst having 5 mm. in length and 3 mm. in diameter and the average value was calculated.

The catalyst employed includes the Catalyst [A] in Example 1, the Catalyst [E] in Example 2 in the method of the present invention and, as a comparative example, Catalyst [G] prepared by the method which does not comprise a step for adding aqueous ammonia after lowering the pH to 2.5 by addition of an acid or a step for raising the pH to 8 in the method for preparing the Catalyst [E]. The above method for preparing the Catalyst [G] is completely identical with the method for producing the Catalyst [E] excepting the step for raising the pH to 8.

The results of this experiment for measuring crush strength show that the crush strengths of Catalysts [A], [E] and Comparative Catalyst [G] were 5.1 Kg., 4.9 Kg. and 2.7 Kg., respectively. As shown above, the Catalyst [G] was considerably inferior in properties to other catalysts.

We claim:

1. A process for preparing a catalyst for the conversion of hydrocarbon which comprises preparing silica-alumina be reacting a water-soluble aluminum salt and a water-soluble silicon salt in an aqueous solution while maintaining the pH at least at 10, said salts being water-soluble at said pH, adding to the reaction solution an acid to adjust the pH to from about 1 to below 5 and increasing the pH of the resulting acid solution to 5–9 by addition of an alkali; blending said silica-alumina and a crystalline alumino-silicate zeolite having a silica and alumina molar ratio of at least 2.5:1 and a micropore diameter of 5–15A so that the finished catalyst contains 5–60% by weight of said crystalline alumino-silicate; and carrying at least one hydrogenation-active metal thereon; said blending of crystalline alumino-silicate being conducted at any step before drying for dehydration of said silica-alumina; and at least 60% of an ion-exchangeable alkali metal of said crystalline alumino-silicate being replacing with hydrogen and/or at least one polyvalent metal before and/or after said blending.

2. A process according to claim 1 wherein the silica-alumina contains 5–95% by weight of silica, and preferably 30–90% by weight of silica and 70–10% by weight of alumina.

3. A process according to claim 1 wherein the silica-alumina contains 0.3–15% by weight of combined halogen on the basis of the total weight of the catalyst.

4. A process according to claim 1 wherein the source of said silicon salt is a member selected from the group consisting of alkali metal silicates, water glass and silica sol and the source of said aluminum salt is a member selected from the group consisting of aluminum sulfate, aluminum nitrate, aluminum chloride, alum, and sodium aluminate.

5. A process according to claim 1 wherein ammonia, organic base or inorganic base other than ammonia is added to an aqueous solution of said aluminum salt and/or an aqueous solution of said silicon salt in order to maintain the pH of the aqueous solution at least at 10.

6. A process according to claim 1 wherein the reaction between said aluminum salt and silicon salt is conducted at a temperature from −10° to 90°C.

7. A process according to claim 1 wherein the acidified mixture is aged at a temperature from −10° to 90°C. for 0.1–100 hours and, after said addition of alkali, additionally aged for 0.1–240 hours.

8. A process according to claim 1 wherein the crystalline alumino-silicate is a member selected from the group consisting of natural or synthetic mordenite, faujasite and synthetic zeolite X and Y.

9. A process according to claim 1 wherein at least 60% of an ion-exchangeable alkali metal of the crystalline alumino-silicate is replaced with at least one element selected from the group consisting of hydrogen, metals of Groups IB – VIII in the Periodic Table and rare earth metals.

10. A process according to claim 1 wherein an ion-exchange treatment is conducted with a solution containing cation such as ammonium ion in order to replace at least 60% of an ion-exchangeable alkali metal of the crystalline alumino-silicate with hydrogen.

11. A process according to claim 1 wherein the crystalline alumino-silicate is mordenite which is treated with a mineral acid to replace an alkali metal cation thereof with hydrogen and/or to dissolve the aluminum contained in the mordenite.

12. A process according to claim 1 wherein the hydrogenation-active metal is at least one element selected from the group consisting of metals of Groups VI, VII and VIII in the Periodic Table and the element is blended in an amount of about 0.1 to 40% by weight on the basis of the finished catalyst.

13. A process according to claim 1 wherein a precious metal selected from the group consisting of platinum and palladium is blended in an amount of about 0.1 to 2.0% by weight on the basis of the finished catalyst.

14. A process according to claim 1 wherein a hydrogenation-active metal other than precious metal is blended in an amount of about 5.0 to 40.0% by weight on the basis of the finished catalyst.

15. Process according to claim 1 including the further step of dissolving additional aluminum salt and/or silicon salt in the acidified solution before the step of increasing the pH.

16. A catalyst for the conversion of hydrocarbon prepared by the process which comprises preparing silica-alumina by reacting a water-soluble aluminum salt and a water-soluble silicon salt in an aqueous solution while maintaining the pH at least at 10, said salts being water-soluble at said pH, adding to the reaction product and acid to adjust the pH from about 1 to below 5 and adding to the aqueous acid solution an alkali to raise the pH to 5–9; blending said silica-alumina and a crystalline alumino-silicate zeolite having a silica and alumina molar ratio of at least 2.5:1 and a micro-pore diameter of 5–15A so that the finished catalyst contains 5–60% by weight of said crystalline alumino-silicate; and carrying thereon at least one hydrogenation-active metal; said blending of crystalline alumino-silicate being conducted at any step before drying for dehydration of said silica-alumina, and at least 60% of an ion-exchangeable alkali metal of said crystalline alumino-silicate being replaced with hydrogen and/or at least one polyvalent metal before and/or after said blending.

* * * * *